No. 631,255. Patented Aug. 15, 1899.
A. KLAWON.
FOOT GUARD FOR SHOVELS.
(Application filed Dec. 7, 1898.)
(No Model.)
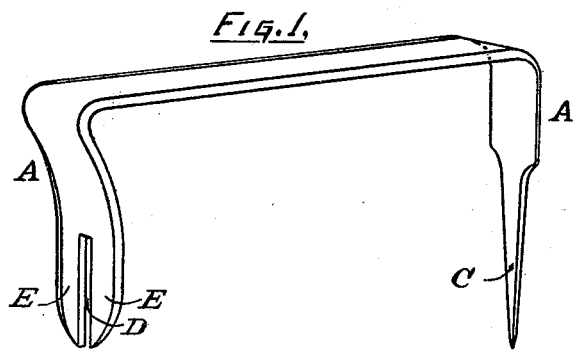
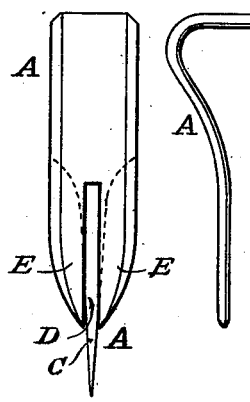
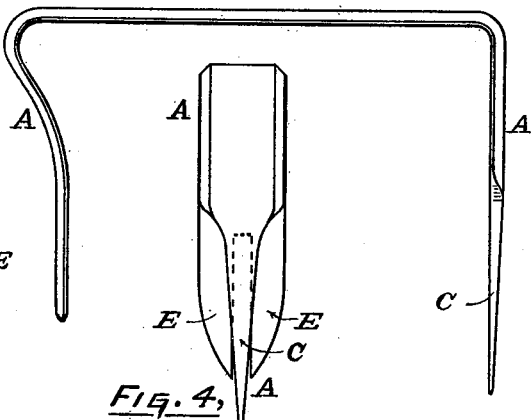
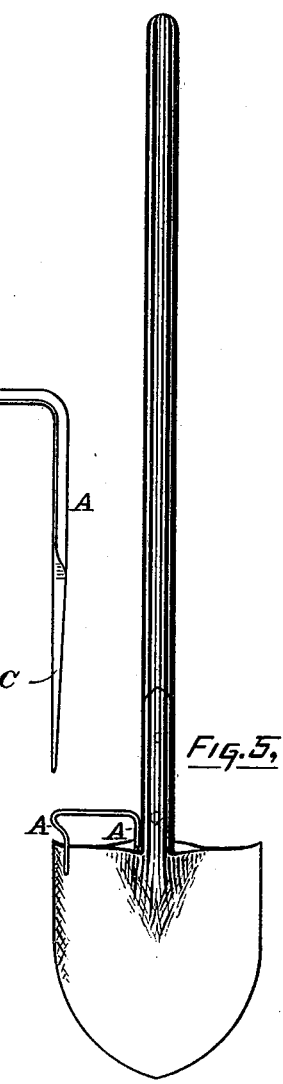
WITNESSES:
Thomas Mattismore
E. M. Frast.
INVENTOR:
August Klawon,
BY Josiah B. Frost,
his
ATTORNEY.

UNITED STATES PATENT OFFICE.

AUGUST KLAWON, OF JACKSON, MICHIGAN.

FOOT-GUARD FOR SHOVELS.

SPECIFICATION forming part of Letters Patent No. 631,255, dated August 15, 1899.

Application filed December 7, 1898. Serial No. 698,587. (No model.)

*To all whom it may concern:*

Be it known that I, AUGUST KLAWON, a citizen of the United States, residing at Jackson, in the county of Jackson and State of Michigan, have invented a new and useful Improvement in Foot-Guards for Shovels, of which the following is a specification.

My invention relates to foot-guards for shovels; and the object of my invention is to furnish a foot-guard for shovels that will be substantial, will hold to its place, and will be out of the way of interfering with the dirt or other material being shoveled. This object I attain by the device illustrated in the accompanying drawings, in which—

Figure 1 is a perspective view of my device; Fig. 2, a side elevation. Figs. 3 and 4 are views of the respective ends; Fig. 5, a shovel with my device attached.

Similar letters refer to similar parts throughout the several views.

A A is a foot-guard for a shovel made of flat steel bar—say three-fourths of an inch wide by one-eighth inch thick—the edges of which may be round or beveled, as shown. The ends are bent downward, one of the ends terminating in a tang C, as shown in Figs. 1, 2, 3, and 4, to be driven into the wood of the shovel-blade, as shown in Fig. 5. The end of the guard opposite the tang end is provided with a slot D, dividing the end into jaws E E, Figs. 1, 3, and 4, which stride the blade of the shovel, and being forcibly driven onto it the grip of the jaws E E on the blade, together with the grip of the wood around the tang, secures the guard firmly in place, as shown in Fig. 5.

I am aware that foot-guards for shovels have been made before my invention.

Having fully described my invention, what I claim, and desire to secure by Letters Patent, is—

A foot-guard for shovels having its ends downwardly inclined and terminating one end with a tang and the other end with jaws, substantially as and for the purposes described and set forth.

AUGUST KLAWON.

Witnesses:
 JOSIAH B. FROST,
 CLAUDE GREENE.